US010785383B2

(12) United States Patent
Bunker et al.

(10) Patent No.: US 10,785,383 B2
(45) Date of Patent: *Sep. 22, 2020

(54) SYSTEM AND METHOD FOR MANAGING SECURITY SETTINGS OF A PRINT DEVICE USING A LOCKDOWN MODE

(71) Applicant: Xerox Corporation, Norwalk, CT (US)

(72) Inventors: Keith G. Bunker, Hilton, NY (US); Kenneth B. Schleede, Webster, NY (US); Susan Marie Healy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,657

(22) Filed: Oct. 29, 2019

(65) Prior Publication Data

US 2020/0068094 A1    Feb. 27, 2020

Related U.S. Application Data

(63) Continuation of application No. 15/010,666, filed on Jan. 29, 2016, now Pat. No. 10,498,928.

(51) Int. Cl.
*H04N 1/44* (2006.01)
(52) U.S. Cl.
CPC ......... *H04N 1/4433* (2013.01); *H04N 1/4426* (2013.01)
(58) Field of Classification Search
CPC .................. H04N 1/4433; H04N 1/4406
See application file for complete search history.

(56) References Cited

U.S. PATENT DOCUMENTS

| 7,395,436 | B1* | 7/2008 | Nemovicher | ....... G06F 21/6218 |
| | | | | 713/166 |
| 8,139,264 | B2 | 3/2012 | Rouhana et al. | |
| 8,601,170 | B1 | 12/2013 | Marr et al. | |
| 2003/0177389 | A1* | 9/2003 | Albert | ................. H04L 12/2856 |
| | | | | 726/1 |
| 2011/0063670 | A1 | 3/2011 | Ito | |
| 2014/0223571 | A1 | 8/2014 | Koara | |
| 2015/0278669 | A1* | 10/2015 | Akiyama | ........... G06K 15/4095 |
| | | | | 358/1.14 |
| 2016/0050331 | A1 | 2/2016 | Maki | |

* cited by examiner

*Primary Examiner* — King Y Poon
*Assistant Examiner* — Michael Burleson
(74) *Attorney, Agent, or Firm* — Fox Rothschild LLP

(57) ABSTRACT

A method for managing security settings of a print device using a lockdown mode includes receiving a request for enabling a lockdown mode. The lockdown mode prevents modifications to configurations of one or more components of the print device. The method further includes activating the lockdown mode. Activating the lockdown mode includes modifying a plurality of security settings corresponding to lockdown configurations of the one or more components of the print device, and disabling one or more modes that a user may use to modify the plurality of security settings. The method includes storing the plurality of security settings and the associated lockdown values in a security module, performing a compliance check to detect if current values associated with the plurality of security settings have changed by comparing to the lockdown values, and performing a remediation action in response to detecting that the one or more security settings have changed.

20 Claims, 4 Drawing Sheets

SYSTEM AND METHOD FOR MANAGING SECURITY SETTINGS OF A PRINT DEVICE USING A LOCKDOWN MODE

RELATED APPLICATIONS AND CLAIM OF PRIORITY

This application claims priority to and is a continuation of U.S. patent application Ser. No. 15/010,666, filed Jan. 29, 2016, the disclosure of which is hereby incorporated by reference in its entirety.

BACKGROUND

Many printing devices and print devices (MFDs) such as copiers, scanners, fax machines and, and other document processing devices include memory, such as magnetic and optical storage media and including removable disk systems, hard drives, and other storage media systems allowing the device and/or a user to store related to a job. Enterprises such as hospitals and health insurance groups often have additional security measures associated with such devices to prevent unauthorized access to sensitive data that may be stored on a device. For example, there may exist corporate security policies that dictate that certain MFD, copier and printer settings must be at a specified value and can never be changed.

However, it is often difficult to ensure compliance with such policies because system administrators or other personnel may still have the ability to change such security settings and/or access data stored on a machine. Alternatively, if the device settings and controls aren't secure, an unauthorized user may mistakenly or intentionally alter and reroute document processing jobs, open saved copies of documents, or reset the device to its factory defaults, thereby wiping out all of required settings.

The current disclosure discloses a system and method to prevent modification of a collection of security settings on a print device.

SUMMARY

In an embodiment, a method (and system) for managing security settings of a print device using a lockdown mode may include receiving, by a processor, a request for enabling a lockdown mode from an authorized user. A print device in a lockdown mode prevents modifications to configurations of one or more components of the print device. A lockdown unit of the system may activate the lockdown mode in response to the request. Activating the lockdown mode may include modifying a plurality of security settings corresponding to lockdown configurations of the one or more components of the print device, and disabling one or more modes that a user may use to modify the plurality of security settings. The lockdown unit may also store the plurality of security settings and the lockdown values associated with each of the plurality security settings in a security module. The system may also perform a compliance check to detect if current values associated with one or more of the plurality of security settings have changed by comparing to the lockdown values stored in the security module, and perform a remediation action in response to detecting that the one or more security settings have changed. The remediation action may current values associated with the one or more security settings to the lockdown values. A compliance check may be performed periodically, at pre-defined time intervals, when the print device is powered on, and/or in response to a user request. In an embodiment, the system may receive the lockdown values associated with each of the plurality of security settings from the user along with the request to enable the lockdown mode.

In an embodiment, the method may also include generating a compliance report if the current values associated with each of the plurality of security settings are the same as the lockdown values associated with each of the plurality of security settings. In another embodiment, the method may include generating a notification if current values associated with one or more of the plurality of security settings have changed. The notification may include one or more of the following: a report of non-compliance comprising information relating to the one or more security settings, and a report of the remediation action undertaken. Generating the notification may include one or more of: generating a printed report, generating a device fault indication, generating a user interface message, performing a log entry, and sending an e-mail to a system administrator.

In at least one embodiment, the method may also include performing a second compliance check after performing the remediation action to detect whether the values associated with the one or more security settings were successfully changed to the lockdown values, and determining that the remediation was successful if the values associated with the one or more security settings were successfully changed to the lockdown values, else determining that the remediation was unsuccessful. If the remediation is determined to be unsuccessful, the system may shut down the print device.

In an embodiment, the plurality of security settings may include one or more of the following: read/write access to an external storage media, user data encryption, an audit log feature for maintaining a record of activities performed at a print device, a hard drive overwrite feature for the print device, and one or more security protocols on the print device to protect against a malware attack. The lockdown values associated with each of the plurality of security settings may include one or more of: disable scanning of data from the print device to the external storage drive, disable use of one or more resources resource of the print device for processing stored on the external storage device, enable user data encryption, enable the audit log feature, enable periodic hard disk overwrite, enable data overwrite after each processing job at the print device, and enable one or more of the security protocols to protect against a malware attacks.

DETAILED DESCRIPTION

Figure 1:
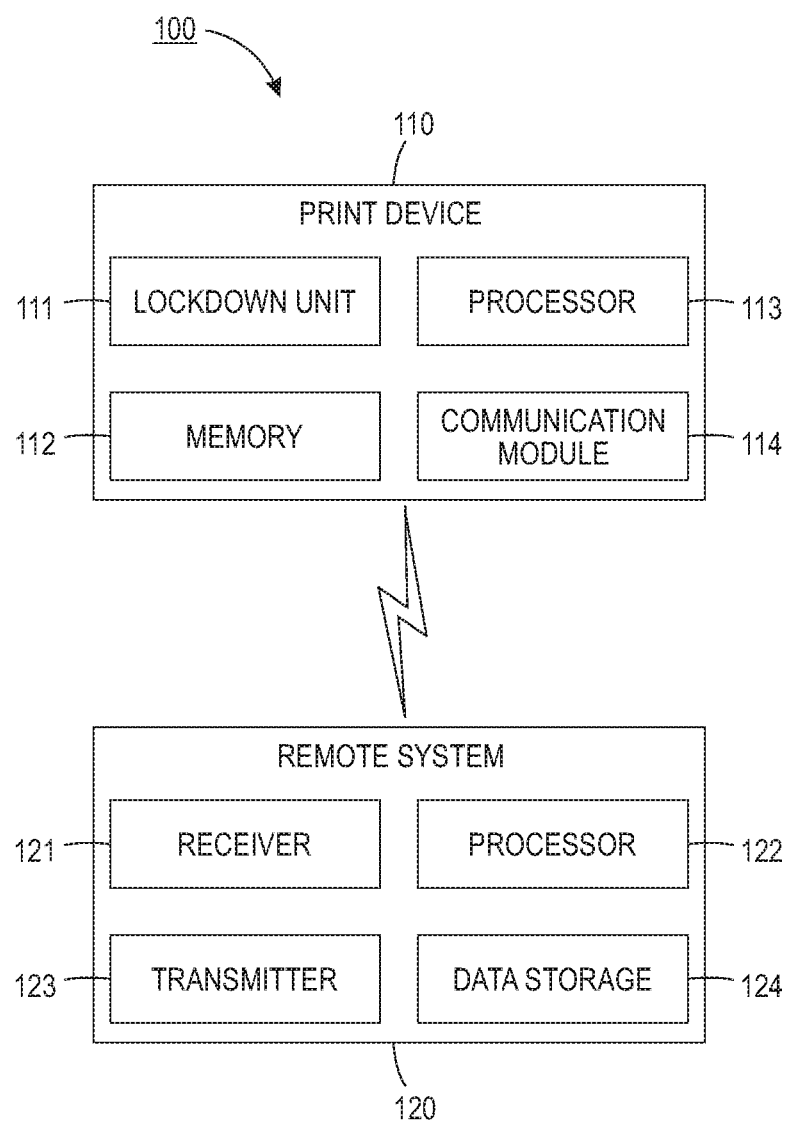
FIG. 1 is a schematic illustration of an example system for managing security settings of a print device, according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

A "print device" refers to a device that includes a print engine for printing documents. The print device may also include a communication interface, a lockdown unit, a processor that can process the document and a non-transitory memory device for storage of programming instructions, documents or portions of documents. Any suitable print device can be used including, but not limited to, inkjet and laser print devices, copiers, print devices, and the like.

"The term "multi-function device" (or "MFD") refers to a machine comprising hardware and associated software configured for enable the device to print documents on substrates, as well as perform at least one other function such as copying, facsimile transmitting or receiving, image scanning, emailing, or performing other actions on document-based data.

The term "document" refers to electronic data, information, or other content. A document may include a text file, a Web page, a newsgroup posting, a picture, media, hyperlinks, a graphic, an image, and/or the like. The document may, for example, include several areas of text, and other areas of images or graphics. The text, for example, may include narrative sections of some length, as well as titles and captions.

The term "lockdown mode" refers to a state of a print device in which certain hardware components (such as a lockdown unit) are activated that enforces a set of security rules for preventing any modifications to the configuration of certain software and/or hardware components of the print device without performing a disk formatting operation on the print device. A "lockdown mechanism" maintains a print device in a lockdown mode. In an alternate embodiment, in a lockdown mode, a rule set may also define an access control list that identifies which users are authorized to access and/or use various device applications. For example, once activated, the lockdown mode may only be disabled by users identified in the access control list. When a user attempts to disable lockdown mode, the print device first checks the access control list to determine whether or not the user is one of the specified users that be allowed to do so. If the user is one of the specified users, only then the print device allows the user to disable lockdown mode. In an embodiment, the access control list may indicate that no user may be allowed to disable lockdown mode, i.e., the lockdown mode may only be disabled performing a disk formatting operation on the print device.

The term "security settings" refers to a set of rules associated with software and/or hardware components of a print device that when enforced by an operating system of the print device control read/write access to and/or use of various applications, resources, and/or files of the print device. In other words, the security settings define the configuration of the software and/or hardware components of a print device. Examples of the security settings may include without limitation enabling or disabling read/write access to an external storage media such as a portable USB drive, enabling or disabling user data encryption, enabling or disabling a log of activities performed at a print device, enabling or disabling a hard drive overwrite (and related settings) for the print device, increase or decrease security protocols to protect against malware attacks (such as McAfee embedded control), and other similar settings.

The term "security module" refers to a set of security settings and corresponding values associated with a particular state of the print device (such as a lockdown state).

FIG. 1 is a block diagram that illustrates various elements system 100 that may be used to assist in the configuration and implementation of the lockdown method as discussed below with respect to FIG. 2. The system may include a print device 110. In an embodiment, the print device 110 may include a lockdown unit 111 that activates a lockdown mode and/or enables a lockdown mechanism. The lockdown unit 111 may also be configured to install a lockdown security module into a memory unit 112 of the print device 110, as discussed below. The lockdown security module is a set of security settings associated with a lockdown mode for a print device.

Figure 4:
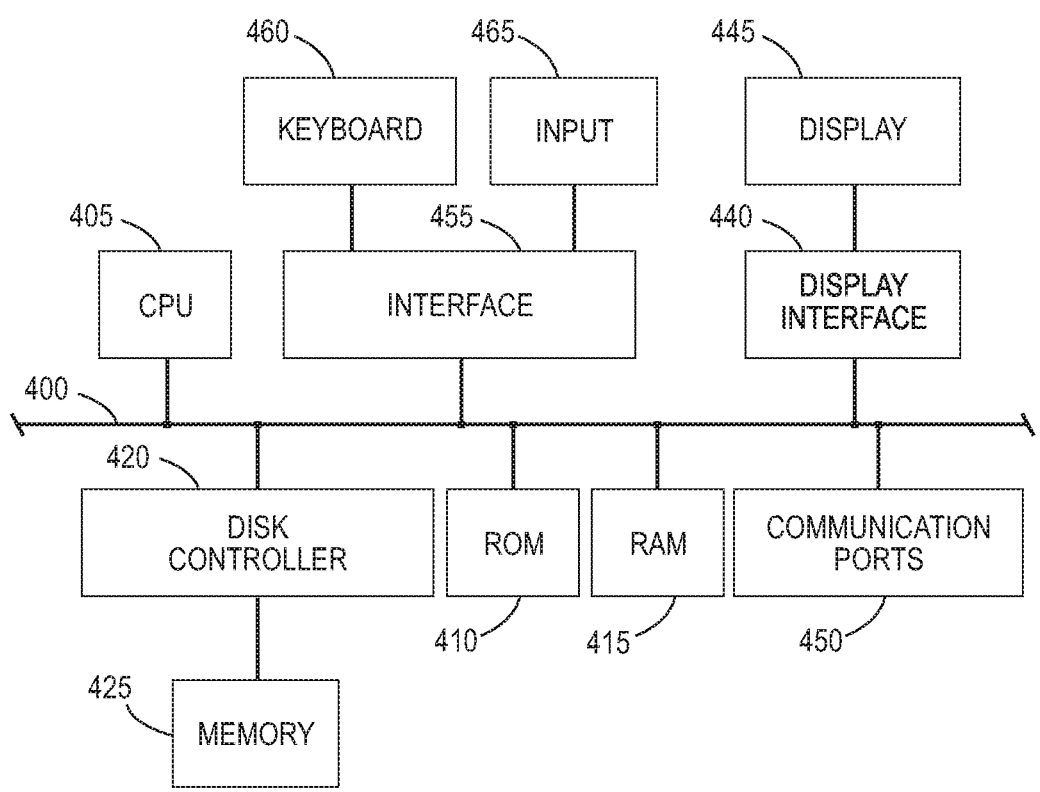
FIG. 4 depicts a block diagram of example hardware that may be used to contain or implement program instructions, according to an embodiment.

In an embodiment, the print device 110 may also include a processor 113 that is in electronic communication with the other elements of the print device. The processor 113 may be configured to generate security settings from the security module and/or enable a lockdown mechanism, as discussed below, in conjunction with the lockdown unit 111. The print device 110 may include a communication module 114 that is capable of transmitting and/or receiving data via one or more communication modules (such as Wi-Fi, internet, short range communications, or the like). In an embodiment, the print device 100 may also include a user interface to transmit to and/or receive instructions from a user of the print device. Example may include, without limitation, a display, a touchscreen, an audio interface, or the like. Example internal configuration of a print device is shown in FIG. 4 below.

The system may also include a remote system 120 is in electronic communication with the print device and may include features such as a receiver 121, a processor 122, a transmitter 123 and data storage facility 124.

The system also includes a computer-readable medium containing programming instructions that, when executed, cause the print device processor 114, the remote system processor 122, both processors and/or other processing devices to: (i) analyze instructions received from a user of the print device; (ii) analyze a security module; and (iii) instruct the lockdown unit 113 of the print device to activate a lockdown mode and/or enable a lockdown mechanism. The computer-readable medium may be a memory unit 112 of the print device 110, or a memory of another device such as a remote system 120 that is in communication with the print device 110.

Figure 2:
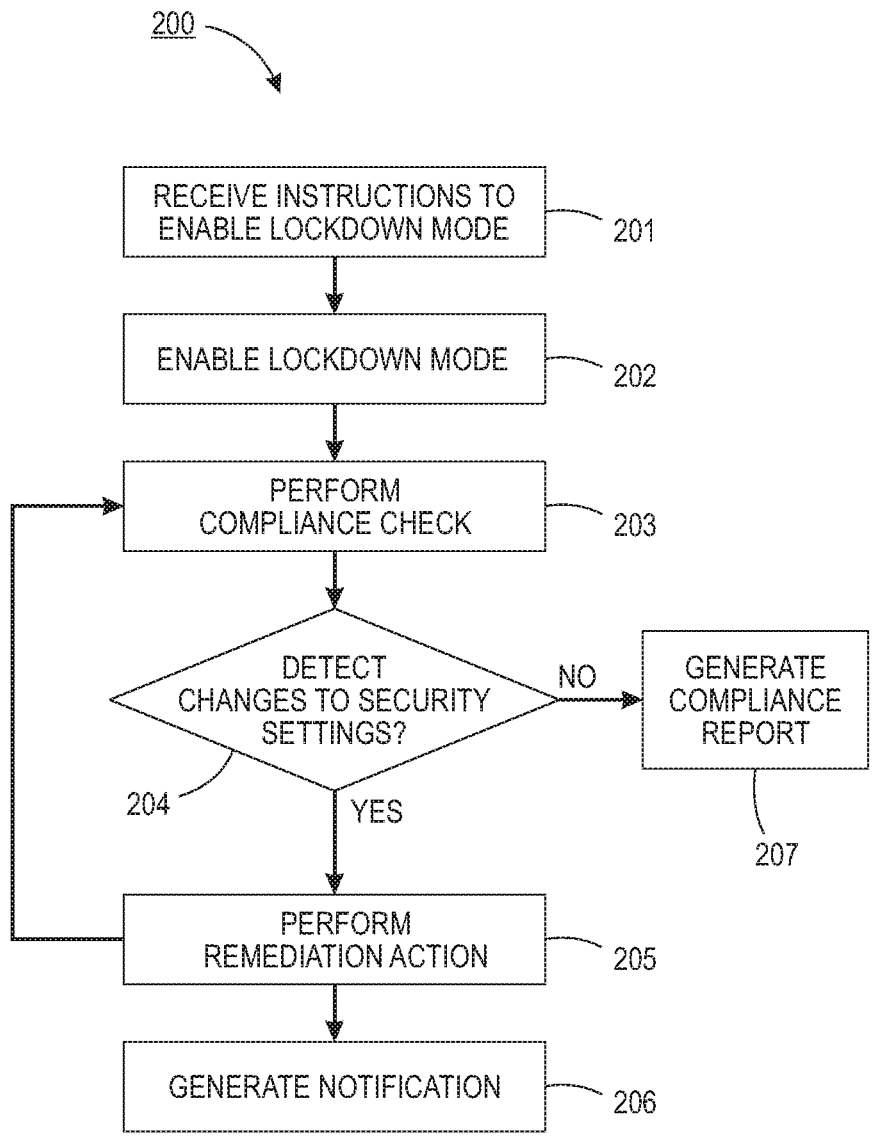
FIG. 2 depicts a flow chart of an example process for managing security settings of a print device using a lockdown mode, according to an embodiment.

FIG. 2 depicts a flow chart of an example process for managing the security settings of a print device via a lockdown mechanism. In step 201, the system may receive instructions from a user to activate a lockdown mode for a print device. In certain embodiments, the system may prompt a user to provide authentication credentials upon receipt of enable lockdown mode instructions. Example of authentication credentials may include, without limitations, an authorization code, a username and password, a physical authentication (such as a fingerprint), or the like.

As discussed above, in lockdown mode configuration of certain software and/or hardware components of the print device may not be modified by a user. For example, in lockdown mode the print device may enforce a rule set that prevents any modification of and/or access to certain pre-defined security settings of the print device.

In an embodiment, the pre-defined security settings of the print device associated with the lockdown mode may be provided by a user of the print device. For example, in an embodiment, the system may display a list of security settings to an authorized user and allow the user to select which of the security settings the user would like to be included in the lockdown mode. A user may also define the corresponding values of the selected security settings. For example, in an embodiment, in a lockdown mode, the system may include one or more of the following security settings: enable user data encryption, disable scanning of data to an external storage drive, disable use of resource of the print device for processing documents and/or data stored on an external storage device, enable increased security protocols against malware attacks, enable audit log accounts, and/or hard disk overwrite. The above examples of security settings are merely provided for exemplary purposes and other types of security settings and associated values are within the scope of this disclosure. As discussed above, once enabled, in lockdown mode, the system will prevent any modification and/or access to the selected security settings and will enforce the selected security settings via a lockdown mechanism.

In an embodiment, the security settings associated with a lockdown mode and the corresponding values may be pre-installed in a print device.

Alternatively and/or additionally, the system may allow a user to configure one or more of the above security settings. For example, a user may configure the frequency of the hard disk overwrites the print device must perform (such as immediately after each processing job remove all data related to the processing job, overwrite the complete data memory at specific time intervals, and/or the like). A user may also specify the number of overwrites and the types of patterns to be used for overwriting. In another example, the user may specify the type of encryption protocols to be used for user data encryption, the types of protocols for protection against malware, or the like.

In step 202, in response to receiving the enable lockdown mode instruction from a user, the system may activate the lockdown mode so as to prevent any modifications to the configuration of certain software and/or hardware components of the print device, without performing a hard drive formatting operation. In an embodiment, during activation of lock-down mode, the system may modify the security settings of the print device to values associated with the lockdown mode, such that the security rules enabled at the time of the activation are enforced and such that the rules disabled at the time of the activation are not enforced.

As discussed above, the security settings define configurations of various hardware and/or software components of a print device, and as such modifying the security settings changes the configuration of the hardware and/or software components. For example, for enabling hard-disk overwrite, the system may provide software components for enabling hard-disk overwrite to the print device and execute the software components. In another example, for enabling data encryption, the system may activate data encryption hardware components such a random number generator, a crypto-module, or the like. Alternatively and/or additionally, the system may provide software components for enabling software based data encryption. The above examples are provided merely for exemplary purposes and other software and/or hardware configurations, and modifications are within the scope of this disclosure.

Figure 3:
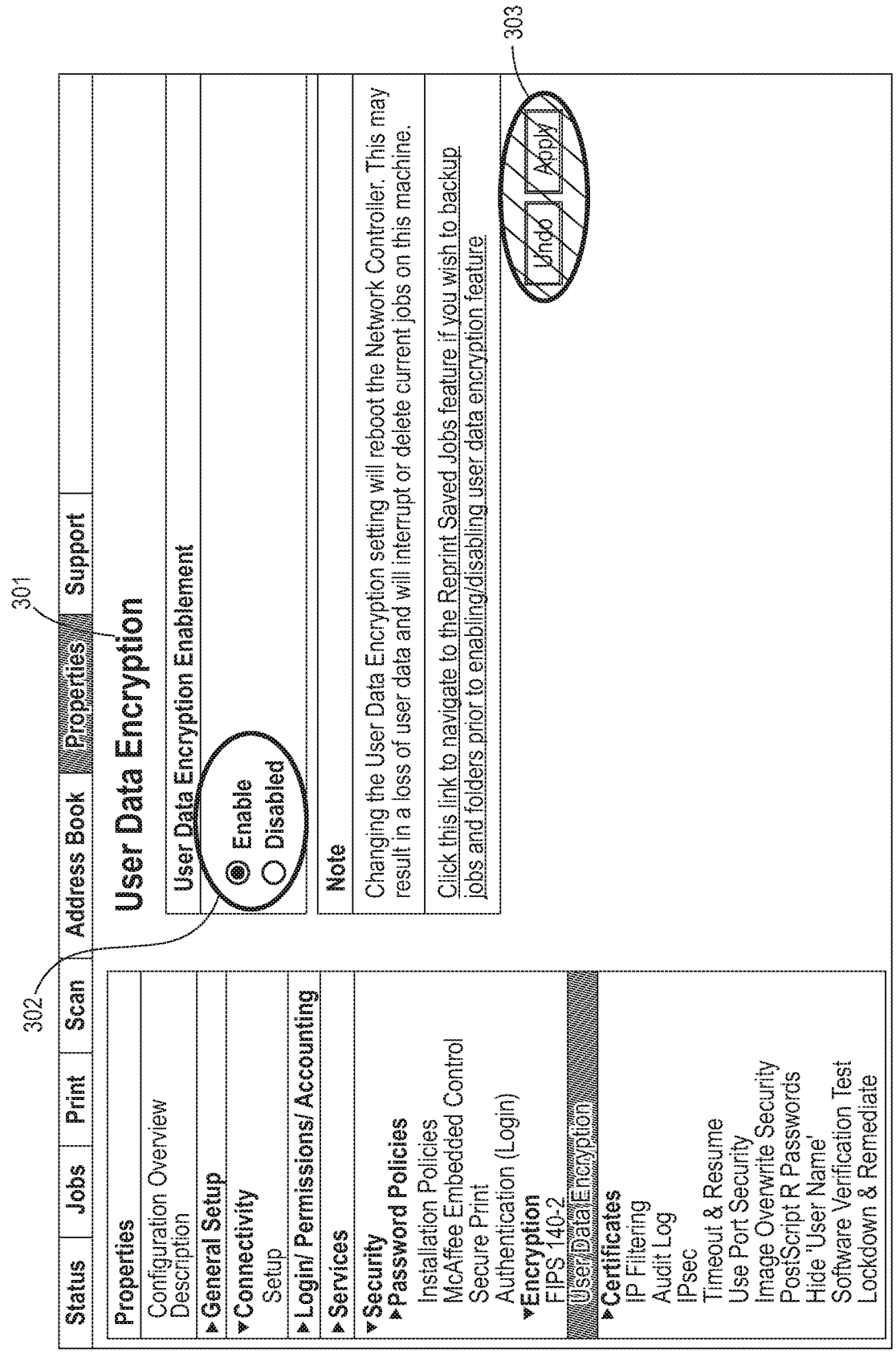
FIG. 3 illustrates an example user-interface of a print device in lockdown mode, according to an embodiment.

An authorized system administrator may modify the print device's security settings from local device user interface, a web user interface, a simple network management protocol (SNMP) network protocol, or the like. However, once a lockdown mode is activated, a user may not modify the device security settings. In an embodiment, upon activation of lockdown mode, the system may execute a command that causes installed software or firmware to disable (or otherwise make inaccessible) any means or modes that a user may use to modify the lockdown security settings. For example, the system may disable the above user interface, web user interface, and/or SNMP protocol, to prevent modification of the device security settings. FIG. 3 illustrates an example user interface of a print device in lockdown mode. As shown in FIG. 3, the value 302 associated with the security setting of "user data encryption" 301 is set to "enabled." Further, the icons 303 that might allow a user to modify the security setting value are removed, greyed out, or otherwise made inaccessible in order to maintain the print device in a lockdown mode.

Additionally and/or alternatively, the system may also store the selected and/or pre-defined security settings and their corresponding values associated with the lockdown mode as a security module. The security module thus maybe indicative of which security settings are enabled and which settings are disabled at the time of the activation, and it is, therefore, possible for the security rules enabled during activation to be identified by analyzing the security module.

After activation of a lockdown mode, a user may attempt to change the security settings. If successful, the user may compromise the security of the print device. The system may prevent this and maintain the security settings associated with the lockdown mode via a lockdown mechanism. The system may perform 203 periodic compliance checks to detect 204 if a user has made an unauthorized change to the security settings within a print device. When a change is detected, the system may perform a remediation action 205 in order to return the security settings back to their original state before the unauthorized change was made. The system may also generate 206 a notification for a system administrator of the unauthorized change. In an embodiment, the notification may also include a report of the remediation action undertaken by the system, and its result. In certain embodiments, the system may also analyze one or more audit logs of the print device to determine information such as the time of modification of the security settings, an identity of the unauthorized user who made the modification, any unauthorized use of one or more resources of the print device that is contrary to the lockdown mode security settings, or the like. The system may include the above information in the generated notification as well. The system may send the notification via a printed report, a device fault indication, a user interface message, a log entry, an e-mail to a system administrator, or a combination thereof.

The system may perform 203 the compliance checks at any pre-defined time interval, such as daily, weekly, etc. In an embodiment, a user may provide the time interval along with the request for activation of the lockdown mode. In an embodiment, the system may perform the checks immediately upon power on, if the print device was switched off at the regularly scheduled time of the check. Alternatively and/or additionally, a user may provide a print device instructions to perform the compliance checks.

In order to perform the security checks to detect 204 unauthorized changes, the system checks the current value of each security setting against the data stored in the security module stored during activation of the lockdown mode. If the system does not detect any changes in the security settings, the system may generate and save 207 a compliance report. As discussed above, with respect to the notification of an unauthorized change, the system may also send the compliance report via a printed report, a user interface message, a log entry, an e-mail to a system administrator, or a combination thereof.

If the system detects a change in the security settings, the system may use the security settings data stored in the security module to perform a remediation action 205 and return the security settings back to their original state. In an embodiment, the system may then perform the checks again to ensure that the remediation action was successful. The system may repeat steps 203-205, until compliance of the security settings with those stored in the security module is achieved. In an embodiment, if the system continues to detect changes for a certain number times (i.e., fails to perform remediation), it may instruct the print device to shut down and/or become inoperable until receipt of suitable instructions from an authorized user and/or until remediation is successful (i.e., the security settings are returned to their original value).

In an embodiment, the print device may perform the above method steps. Alternatively and/or additionally, a remote system may perform some or all of the above method steps. For example, a remote server may perform the periodic compliance checks, perform remediation actions, and/or generate reports/notifications.

The management of the security settings method and process as described above may be performed and implemented by a print device. FIG. 4 depicts an example of internal hardware that may be used to contain or implement the various computer processes and systems as discussed above. For example, a print device, such as that discussed throughout, may include hardware such as that illustrated in FIG. 4. An electrical bus 400 serves as an information highway interconnecting the other illustrated components of the hardware. CPU 405 is a central processing unit of the system, performing calculations and logic operations required to execute a program. CPU 405, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 410 and random access memory (RAM) 415 constitute examples of memory devices. The term "memory device" and similar terms include single device embodiments, multiple devices that together store programming or data, or individual sectors of such devices.

A controller 420 interfaces with one or more optional memory devices 425 that service as date storage facilities to the system bus 400. These memory devices 425 may include, for example, an external or internal disk drive, a hard drive, flash memory, a USB drive or another type of device that serves as a data storage facility. As indicated previously, these various drives and controllers are optional devices. Additionally, the memory devices 425 may be configured to include individual files for storing any software modules or instructions as discussed above.

Program instructions, software or interactive modules for performing any of the functional steps associated with the processes as described above may be stored in the ROM 410 and/or the RAM 415. Optionally, the program instructions may be stored on a non-transitory, computer readable medium such as a compact disk, a digital disk, flash memory, a memory card, a USB drive, an optical disc storage medium, and/or other recording medium.

An optional display interface 440 may permit information from the bus 400 to be displayed on the display 445 in audio, visual, graphic or alphanumeric format. Communication with external devices may occur using various communication ports 450. A communication port 450 may be attached to a communications network, such as the Internet, a local area network or a cellular telephone data network. The communication ports may also include short range communications interfaces such as NFC, BLE, or RFID interfaces.

The hardware may also include an interface 455 which allows for receipt of data from input devices such as an imaging sensor 460 of a scanner or other input device 465 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method for managing security settings of a print device using a lockdown mode, by a processor:
   receiving, from an authorized user, a request for enabling a lockdown mode, wherein the lockdown mode prevents modifications to configurations of one or more components of the print device;
   in response to the request, activating the lockdown mode, wherein activating the lockdown mode comprises:
      modifying a plurality of security settings corresponding to lockdown configurations of the one or more components of the print device, and
      disabling one or more modes that a user may use to modify the plurality of security settings;
   storing the plurality of security settings in a security module such that the security module comprises lockdown values associated with each of the plurality security settings;
   performing a compliance check to detect if current values associated with one or more of the plurality of security settings have changed by comparing to the lockdown values stored in the security module; and
   performing a remediation action in response to detecting that the one or more security settings have changed, wherein the remediation action changes current values associated with the one or more security settings to the lockdown values.

2. The method of claim 1, further comprising generating a compliance report if the current values associated with each of the plurality of security settings are the same as the lockdown values associated with each of the plurality of security settings.

3. The method of claim 1, further comprising generating a notification if current values associated with one or more of the plurality of security settings have changed, wherein the notification comprises one or more of the following:

a report of non-compliance comprising information relating to the one or more security settings; and
a report of the remediation action undertaken.

4. The method of claim 3, wherein generating the notification comprises one or more of the following:
generating a printed report;
generating a device fault indication;
generating a user interface message;
performing a log entry; and
sending an e-mail to a system administrator.

5. The method of claim 1, further comprising:
performing a second compliance check after performing the remediation action to detect whether the values associated with the one or more security settings were successfully changed to the lockdown values; and
determining that the remediation was successful if the values associated with the one or more security settings were successfully changed to the lockdown values, else determining that the remediation was unsuccessful.

6. The method of claim 5, further comprising, by the processor, shutting down the print device in response to determining that the remediation was unsuccessful for a certain threshold number of times.

7. The method of claim 1, wherein the compliance check is performed:
periodically, at pre-defined time intervals;
when the print device is powered on; or
in response to a user request.

8. The method of claim 1, wherein the plurality of security settings comprise:
read/write access to an external storage media;
user data encryption;
an audit log feature for maintaining a record of activities performed at a print device;
a hard drive overwrite feature for the print device; and
one or more security protocols on the print device to protect against a malware attack.

9. The method of claim 8, wherein the lockdown values associated with each of the plurality of security settings comprise one or more of the following:
disable scanning of data from the print device to the external storage drive;
disable use of one or more resources resource of the print device for processing stored on the external storage device;
enable user data encryption;
enable the audit log feature;
enable periodic hard disk overwrite;
enable data overwrite after each processing job at the print device; and
enable one or more of the security protocols to protect against a malware attacks.

10. The method of claim 1, wherein the processor may receive the lockdown values associated with each of the plurality of security settings from the user along with the request to enable the lockdown mode.

11. A system for managing security settings of a print device using a lockdown mode comprising:
a processor in communication with the print device; and
a computer-readable medium containing programming instructions that, when executed by the processor, cause the processor to:
receive, from an authorized user, a request for enabling a lockdown mode, wherein the lockdown mode prevents modifications to configurations of one or more components of the print device;
in response to the request, via a lockdown unit of the print device, activate the lockdown mode, wherein activating the lockdown mode comprises:
modifying a plurality of security settings corresponding to lockdown configurations of the one or more components of the print device, and
disabling one or more modes that a user may use to modify the plurality of security settings;
store, via the lockdown unit, the plurality of security settings in a security module such that the security module comprises lockdown values associated with each of the plurality security settings;
perform a compliance check to detect if current values associated with one or more of the plurality of security settings have changed by comparing to the lockdown values stored in the security module; and
perform a remediation action in response to detecting that the one or more security settings have changed, wherein the remediation action changes current values associated with the one or more security settings to the lockdown values.

12. The system of claim 11, further comprising programming instructions, that when executed by the processor, cause the processor to generate a compliance report if the current values associated with each of the plurality of security settings are the same as the lockdown values associated with each of the plurality of security settings.

13. The system of claim 11, further comprising programming instructions, that when executed by the processor, cause the processor to generate a notification if current values associated with one or more of the plurality of security settings have changed, wherein the notification comprises one or more of the following:
a report of non-compliance comprising information relating to the one or more security settings; and
a report of the remediation action undertaken.

14. The system of claim 13, wherein programming instructions, that when executed by the processor, cause the processor to generate a notification comprise programming instructions that when executed by the processor, cause the processor to perform one or more of the following:
generating a printed report;
generating a device fault indication;
generating a user interface message;
performing a log entry; and
sending an e-mail to a system administrator.

15. The system of claim 11, further comprising programming instructions, that when executed by the processor, cause the processor to:
perform a second compliance check after performing the remediation action to detect whether the values associated with the one or more security settings were successfully changed to the lockdown values; and
determine that the remediation was successful if the values associated with the one or more security settings were successfully changed to the lockdown values, else determine that the remediation was unsuccessful.

16. The system of claim 15, further comprising programming instructions, that when executed by the processor, cause the processor to shut down the print device in response to determining that the remediation was unsuccessful for a certain threshold number of times.

17. The system of claim 11, wherein the compliance check is performed:
periodically, at pre-defined time intervals;
when the print device is powered on; or
in response to a user request.

18. The system of claim 11, wherein the plurality of security settings comprise:
- read/write access to an external storage media;
- user data encryption;
- an audit log feature for maintaining a record of activities performed at a print device;
- a hard drive overwrite feature for the print device; and
- one or more security protocols on the print device to protect against a malware attack.

19. The system of claim 18, wherein the lockdown values associated with each of the plurality of security settings comprise one or more of the following:
- disable scanning of data from the print device to the external storage drive;
- disable use of one or more resources resource of the print device for processing stored on the external storage device;
- enable user data encryption;
- enable the audit log feature;
- enable periodic hard disk overwrite;
- enable data overwrite after each processing job at the print device; and
- enable one or more of the security protocols to protect against a malware attacks.

20. The system of claim 11, wherein the processor may receive the lockdown values associated with each of the plurality of security settings from the user along with the request to enable the lockdown mode.

\* \* \* \* \*